Figure 1:
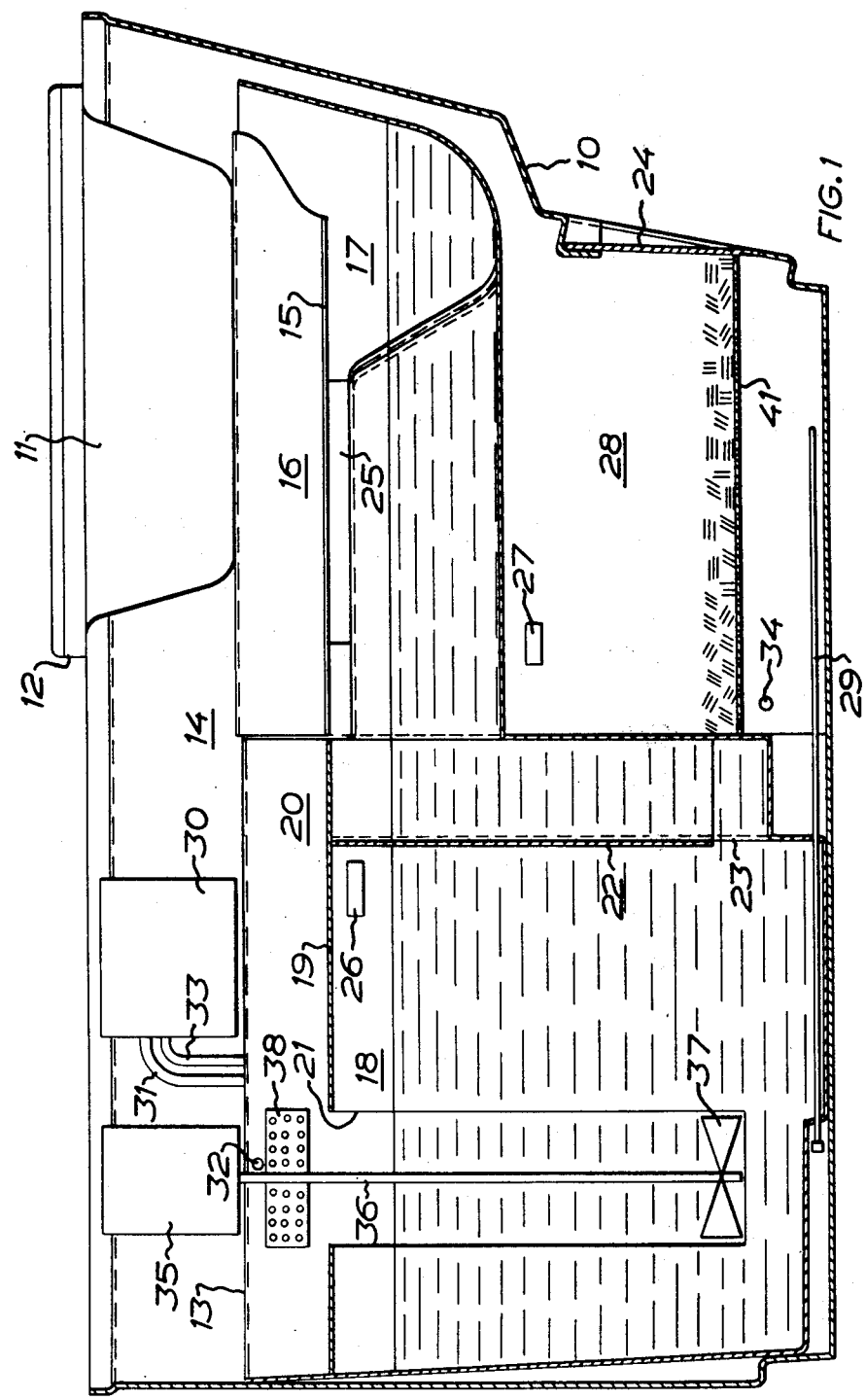

United States Patent [19]

Sundberg

[11] 4,170,797

[45] Oct. 16, 1979

[54] APPARATUS FOR TREATING WASTE MATTER

[76] Inventor: Hardy M. Sundberg, Industrivägen 3, S-437 00 Lindome, Sweden

[21] Appl. No.: 818,353

[22] Filed: Jul. 22, 1977

[30] Foreign Application Priority Data

Jul. 23, 1976 [SE] Sweden ............................. 76083914

[51] Int. Cl.$^2$ ...................... E03D 5/016; E03D 9/10; C02C 1/02
[52] U.S. Cl. .......................................... 4/300; 4/317; 4/319; 4/DIG. 12; 210/168; 210/197; 210/221 M
[58] Field of Search ............... 4/1, 111, 115, DIG. 12, 4/300, 317–322, 347; 210/152, 195 S, 196, 197, 540, 221 M; 71/9; 23/259.1

[56] References Cited

U.S. PATENT DOCUMENTS

| 2,259,243 | 10/1941 | Damar | 210/221 M X |
| 3,224,964 | 12/1965 | Derenk et al. | 210/540 X |
| 3,666,103 | 5/1972 | Green | 210/152 |
| 3,700,565 | 10/1972 | Cornish et al. | 210/152 X |
| 3,834,536 | 9/1974 | Kelsey | 210/152 X |
| 3,837,493 | 9/1974 | Lin | 210/197 |
| 3,843,976 | 10/1976 | Miya | 4/1 |
| 3,878,303 | 4/1975 | Hashimoto | 71/9 X |
| 3,921,228 | 11/1975 | Sundberg | 4/DIG. 12 |

Primary Examiner—Stuart S. Levy
Attorney, Agent, or Firm—Beveridge, DeGrandi, Kline & Lunsford

[57] ABSTRACT

The disclosure relates to a method and apparatus for treating waste matter in aerobic digestion apparatuses, such as closets. In the method a frother means is disposed in the circulation path of the liquid between the pump and the receptacle means, the frother means being arranged to convert a portion of the liquid to froth for the purposes of accommodating matter particles in the wall of the froth bubbles, the froth being at least to a certain extent supplied to the aerobic digestion compartment.

9 Claims, 3 Drawing Figures

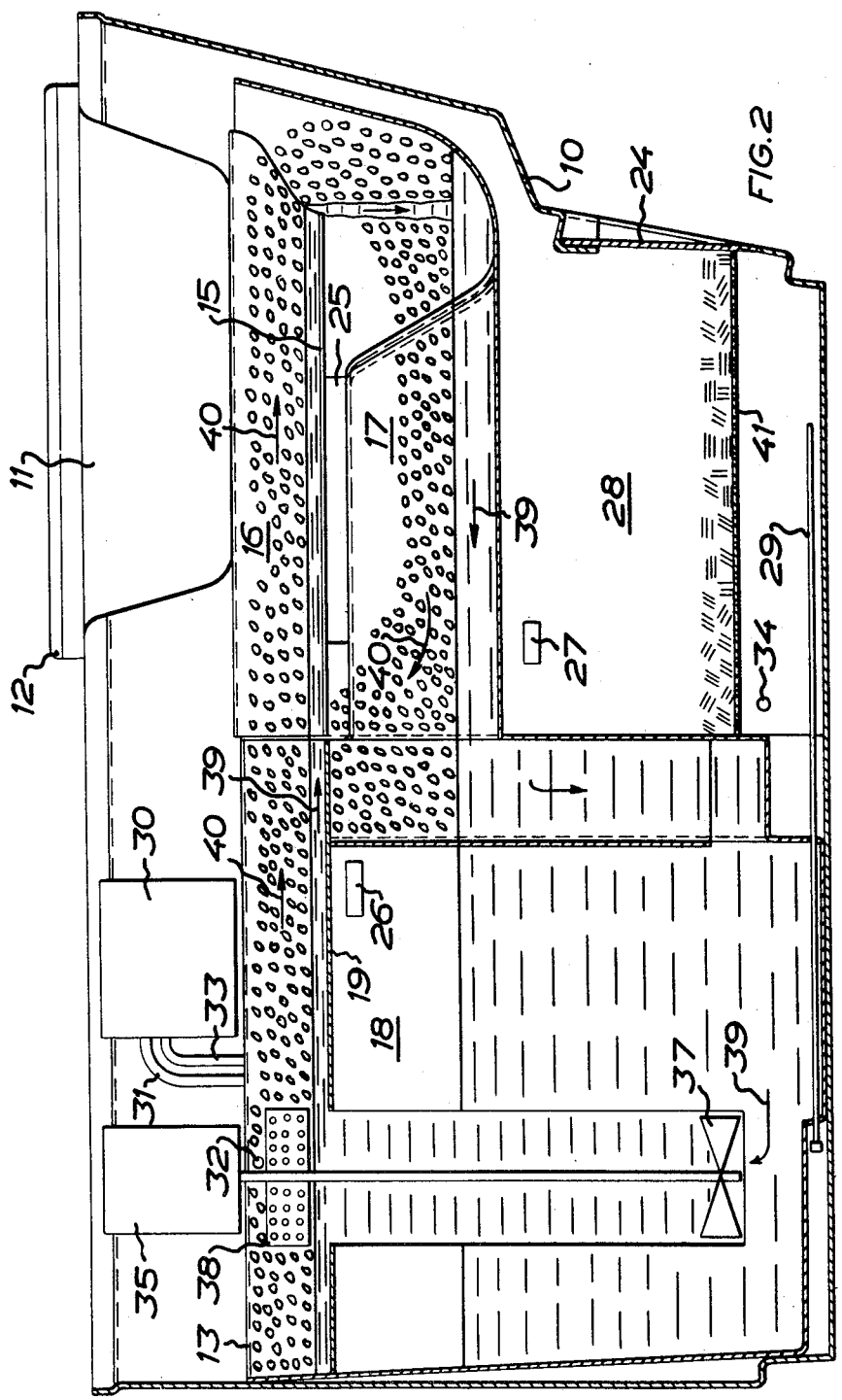

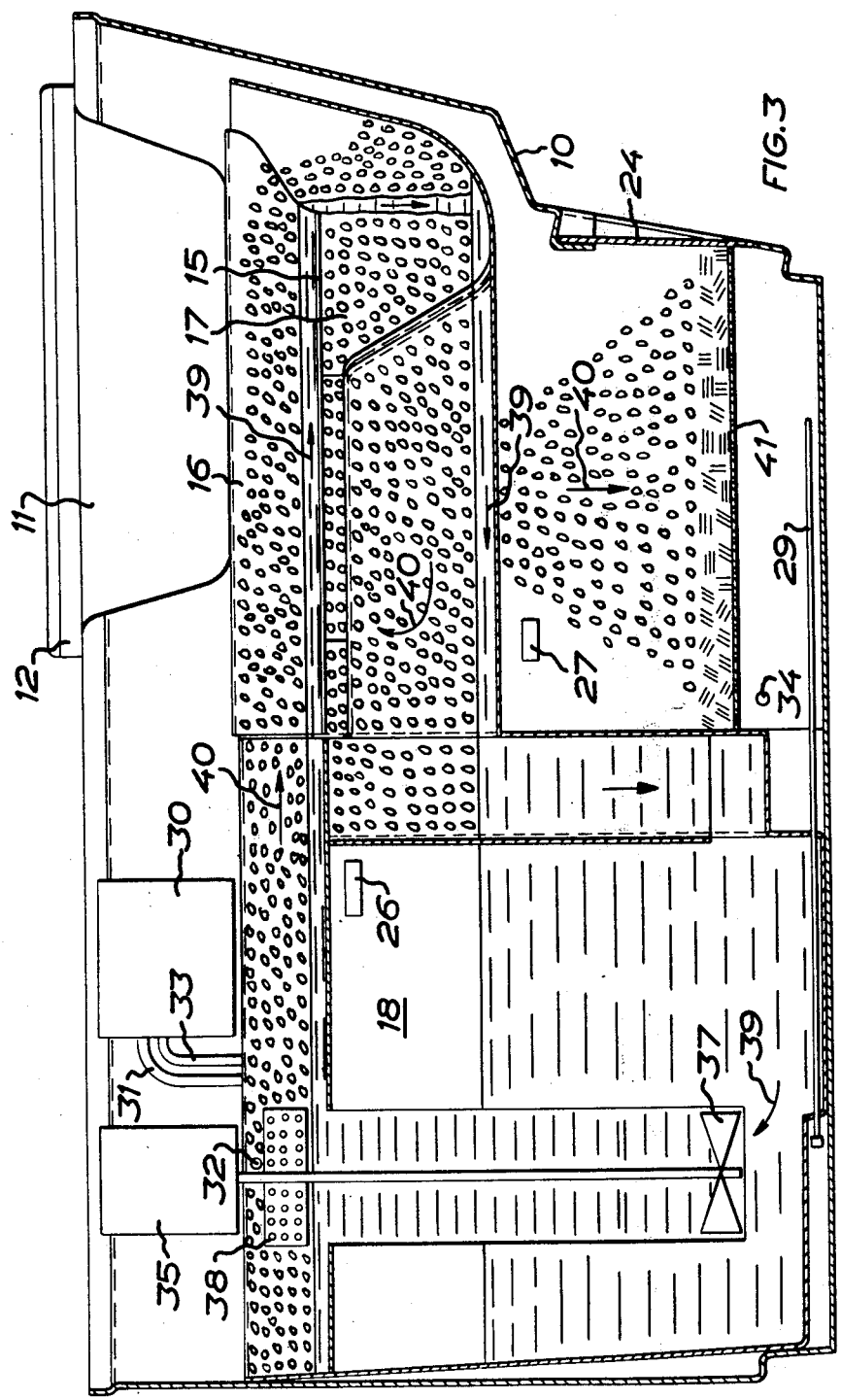

APPARATUS FOR TREATING WASTE MATTER

The present invention relates to a method for treating waste matter in decomposition apparatuses, in particular faeces in decomposition closets.

Today's stricter control of the handling of waste, and in particular waste matter from closets, has entailed problems, in particular in summer cottage areas where the availability of connection to municipal sewage systems is totally absent, aboard ship etc. A certain success has been realised in attempts to solve this problem by electrical combustion, chemical degradation, freezing etc. of the waste matter and, particularly in recent years, by normal aerobic digestion which in certain cases is supported and accelerated by the supply of heat. This type of closet is possessed of many advantages but also disadvantages. Thus, the interior of a closet of this type can hardly be described as attractive to the senses of sight and smell (despite good ventilation) and the aerobic digestion takes place far too slowly.

The primary object of the present invention is, by a novel method, to improve and accelerate aerobic digestion not only in closets of the above-described type but also quite generally.

According to one aspect of the present invention, the waste matter is conveyed by means of a liquid flow to a liquid container in which it is triturated and dispersed. Furthermore, at least a portion of the liquid flow is thereafter caused to pass through a frother device and the froth formed thereby, with waste particles in the walls of the froth bubbles, is at least to a certain extent supplied to an aerobic digestion compartment separate from the liquid container.

According to a further aspect of the present invention, the liquid is caused to pass the frother device at a position between a pump realising the liquid flow and a position where the waste material was deposited.

According to still a further aspect of the present invention the liquid transport direction of the pump is reversible in order to create froth, with the assistance of air supply, in the upper region of the liquid container, the froth being introduced to the aerobic digestion compartment by the intermediary of a conduit disposed for this purpose.

According to still a further aspect of the present invention, both the liquid and the aerobic digestion compartment are heated to a temperature which is favourable to aerobic digestion.

Hence, the entirely novel feature of the present invention is that liquid, normally water, is used in the aerobic digestion closet for flushing away waste from a reception point and conveying it to a liquid container where the waste is triturated by means of the liquid pump and dispersed in the liquid. A portion of the liquid flow is frothed, waste particles being taken up in the wall of the froth bubbles and is supplied to the aerobic digestion compartment in which the waste enters in finely-divided form, which assists in the aerobic digestion which takes place in a humid atmosphere heated to a suitable temperature.

The present invention also relates to an apparatus in the form of an aerobic digestion closet for carrying out this process such that the above-mentioned disadvantages in closets of this type are obviated or reduced.

The present invention and its aspects will be more readily understood from the following description of the accompanying drawings, showing one embodiment, and discussion relating thereto.

In the accompanying drawings:

FIG. 1 is a highly schematic section of a closet made according to the present invention and in inactive position, whereas FIGS. 2 and 3 show in the same manner the closet at the commencement and termination, respectively, of a flushing cycle.

The closet shown on the drawings has an outer casing 10 and an opening 11 in its upper side. The opening 11 is covered by means of a lid 12 which closes tightly on the portion of the casing 10 defining the opening. An insert 13 is placed in the casing 10 of the closet, the insert having a rear, approximately box-shaped portion and a tray-shaped portion projecting horizontally from the upper region of the box-shaped portion, the tray-shaped portion extending forwardly to a position in the vicinity of the front wall of the closet casing 10 in the space beneath the opening 11. An aerobic digestion compartment 28 is disposed beneath this forwardly projecting portion. The aerobic digestion compartment will be described in greater detail below. A space 14 is provided above the insert 13, between the insert and the upper wall of the casing 10. This space accommodates fittings (which will be described in greater detail below) and is in communication with a ventilation conduit (not shown). Receptacle means 15 is placed under the opening 11, this receptacle being arranged to receive faeces, paper etc. entering through the opening 11. The receptacle means 15 extends from the rear end of the forwardly projecting portion of the insert 13 and terminates a distance from the front wall of this portion. Furthermore, the receptacle means 15 has open rear and forward ends for reasons which will be more readily apparent from the following explanation. Furthermore, the projecting portion of the insert 13 is divided by the receptacle means 15 into an upper region 16 and a lower region 17. A distance from its upper wall, the insert 13 has an intermediate wall 19 which divides the box-shaped rear portion of the insert into a lower portion 18 which is intended to function as a liquid container, and an upper portion 20 which is preferably in the form of a spiral achieved by intermediate walls (not shown). A riser pipe 21 discharges in the centre of the spiral and extends vertically downwardly to a position in the vicinity of the bottom of the lower portion 18. A vertical shaft is provided in this portion by means of a further wall 22, the shaft having a discharge opening 23 in the vicinity of the bottom of the portion 18. The upper end of this shaft is in communication with the lower region 17 of the forwardly projecting portion of the insert 13. Overflow openings 25 are also provided in this region 17 and discharge into the aerobic digestion compartment 28 which has a grid 41 in the vicinity of its bottom and is accessible from the outside through a hatch 24. The upper portion of the container 18 is in communication with the compartment 28 by means of a conduit (not shown) which discharges at 26 in the container 18 and at 27 in the compartment 28.

A motor 35 is placed in the ventilated space 14 above the insert 13, the motor having a drive shaft which depends into the rear portion of the insert 13 and extends along the centre line of the riser pipe 21 for supporting a pump impeller 37 in the vicinity of the lower end of the riser pipe. A pair of perforated vanes 38 are fixed to the shaft 36 in the upper portion 20 and are, thus, located directly above the upper end of the riser pipe 21. Furthermore, fan means 30 is provided in the space 14, the pressure side being connected, by means of conduits 31 and 33, to the portion 20 at a position adjacent the perforated vane 38 (as shown at 32) and to the aerobic digestion compartment at a position beneath the grid 41 (as shown at 34). The ventilated space 14 is in communication with the aerobic digestion compartment 28 by the intermediary of the channel defined between the front wall of the forwardly projecting portion of the insert 13 and the front wall of the closet. A heating element 29 is provided in the vicinity of the lower wall of the closet, the heating element being arranged to heat both water which is intended to enter the container 18 and the aerobic digestion compartment 28.

The method of operation of the above-described closet is as follows.

Before the closet is put into operation, water is introduced, for example, to the illustrated level, in the insert 13 which entails that the container 18, the riser pipe 21, the shaft and the region 17 are to a great extent filled with water. Once the closet has been used, that is to say when faeces, paper etc. are present on the receptacle means 15, the lid 11 is closed, the motor 35 and the fan means 30 are activated by means of a manually operable handle (not shown). The impeller 37 then begins to pump up water through the riser pipe 21 to the upper spiral-shaped compartment 20, the water then flowing from the upper portion 20 to the receptacle means 15 through its open rear end and flushes away the faeces, paper etc. from the means 15 down into the lower region 17 of the forward portion of the insert 13 via the open forward end of the means 15 and thence via the shaft to the container 18. At the same time, as will be apparent from FIG. 2, froth is formed in the spiral-shaped portion 20 by the action of the perforated vanes 38 and by the supply of air from the fan means 30 via the conduit 31. As is shown by means of arrows 40, the froth similarly flows over the receptacle means 15 and down into the lower region 17. However, this froth cannot flow into the container 18 but is collected in the region 17 in which pressure is thereby built up. After the flushing operation has continued for a certain time, the froth reaches the overflow 25 and flows via the overflow down into the aerobic digestion compartment 28.

When the faeces, paper etc. enter the container 18 they are attracted by suction to the impeller 37, triturated by the impeller and dispersed in the water. After a certain period of circulation, the particles are very small and are then easily accommodated in the walls of the froth bubbles which were produced by means of the perforated vanes 38. The froth which flows via the overflow 25 down into the aerobic digestion compartment 28 entrains, thus, finely divided material which is immediately attacked by bacteria in the compartment 28 in which extremely favourable conditions of life for the bacteria can be maintained thanks to the heating by means of the element 29 and the humid atmosphere obtained as a result of the bubbles entering the compartment.

If it is desired to supply more material to the compartment 28, the impeller 37 may be rotated in the opposite direction, in which event air will be sucked in through the upper opening of the riser pipe 21 and flow out via the impeller into the container 18 forming bubbles which rise to the upper surface in the container 18 and, once a certain pressure has been reached, flow out through the opening 26 at the upper end thereof and via the conduit connected to the opening and discharging at 26 down into the aerobic digestion compartment 28.

Because of the removal of particles from the water in the closet, this water is kept relatively clean even when the closet is used often. Naturally, further water must be added at regular intervals and when such addition of water is necessary, this can be indicated by means of some suitable conventional signal device.

What I claim and desire to secure by Letters Patent is:

1. Aerobic digestion closet comprising a closet casing, a receptacle opening coverable by means of a lid, a receptacle compartment with receptacle means under said opening, a liquid container in communication with the receptacle compartment, and an aerobic digestion compartment, wherein a trituration pump is provided in said liquid container to circulate liquid in a path over said receptacle means for receiving and conveying material deposited on said means to said liquid container where said matter is triturated and dispersed, wherein a frother means is disposed in the circulation path of the liquid between said pump and said receptacle means, said frother means being arranged to convert a portion of the liquid to froth, wherein communication means supplies said froth at least to a certain extent to said aerobic digestion compartment, and wherein said receptacle means divides said receptacle compartment into an upper and lower compartment of which said upper compartment is, at its one end, connected to said pump by the intermediary of said frother means and, at its other end, is connected to the lower compartment of said receptacle compartment whereas the lower compartment is at its end opposite to the connection with the upper compartment, connected to the liquid container by the intermediary of a vertical channel.

2. The apparatus as recited in claim 1, wherein a vertical riser pipe is disposed in said liquid container, the pump, designed in the form of an impeller, being connected to the lower end of said riser pipe and said frother means being located at the upper end of said riser pipe.

3. The apparatus as recited in claim 2, wherein said frother means is in the form of at least one pair of perforated vanes fixed to a drive shaft and mounted in a spiral-shaped casing with a central inlet and an outlet which discharges adjacent said receptacle means in the upper compartment of said receptacle compartment.

4. The apparatus as recited in claim 2, wherein a driven shaft extends along the longitudinal centre line of said riser pipe, on which shaft are fixed both said impeller and said frother means.

5. The apparatus as recited in claim 1, wherein said communication means comprises at least one overflow outlet means disposed at the top of the lower compartment of said receptacle compartment and communicating with said aerobic digestion compartment, whereby froth is led off to said aerobic digestion compartment.

6. The apparatus as recited in claim 1, wherein the direction of rotation of said pump and said frother means is reversible for froth formation in the liquid container.

7. The apparatus as recited in claim 1, wherein the direction of rotation of said pump and said frother means is reversible for froth formation in the liquid container and, wherein a conduit extends between a position at the top of said liquid container and said aerobic digestion compartment for leading froth from the upper portion of said liquid container to said aerobic digestion compartment.

8. The apparatus as recited in claim 1, further comprising a fan means whose pressure side is connectible both to said frother means and to said aerobic digestion compartment.

9. The apparatus as recited in claim 1, wherein a heater element is provided for heating both the liquid container and said aerobic digestion compartment.

* * * * *